United States Patent Office 2,813,836
Patented Nov. 19, 1957

2,813,836

MANUFACTURE OF GEL BEADS

Edward H. Lebeis, Jr., Media, Pa., assignor to Houdry Process Corporation, Wilmington, Del., a corporation of Delaware No Drawing. Application March 25, 1953,
Serial No. 344,665

6 Claims. (Cl. 252—448)

The present invention relates to improvements in the manufacture of gel beads and is particularly concerned with plant scale operations for the production of silica-alumina and other silica-metal oxide beads for use as catalyst in hydrocarbon conversion processes.

Among the objects of the invention are to provide an economical manufacturing process of high efficiency for plant scale operation, consistently producing from reactant solutions and starting materials gel beads of desired size uniformity and good physical properties. These objects are furthered by the utilization of the novel sequence of steps hereinafter described. Other objects of the invention will be apparent from the detailed description which follows.

In accordance with the invention aqueous solutions of reactants are admixed at suitable pH and product concentration to form a hydrosol capable of rapidly setting to an all embracing hydrogel. This hydrosol is discharged into a water immiscible liquid wherein as a result of surface tension it is formed into small globular masses which set to hydrogel beads in the immiscible liquid. These beads are then partially dried as down to a water content of 300% by weight of the beads on a washed dry (105° C.) basis or somewhat lower water content, with or without previous size classification, and in this condition while still containing a large portion of liquid, are wet-processed to purify the same, further dried and finally heat-treated or calcined to stabilize the gel structure and adjust catalytic activity.

The general sequence of steps above described is disclosed in my copending application Serial No. 187,500, filed September 29, 1950, which issued on January 5, 1954, as U. S. Patent 2,665,258, of which the present application is in part a continuation. The prior application is directed more particularly to the production of gel beads containing included powder introduced into the hydrosol from which the beads are formed. The features of the present invention are applicable to clear (powder-free) as well as to such powder-included beads.

The major steps of the manufacturing process for the production of gel beads in accordance with the invention, each of which steps is described in greater detail below, include: (a) preparation of the solutions, (b) forming the beads, (c) partial drying under conditions providing controlled aging, (d) purifying and (e) final drying. The process will be described as applied to the preparation of silica-alumina bead catalyst, but it will be understood that the general procedure may be applicable to other siliceous cracking catalysts of the gel type including silica-magnesia, silica-zirconia as well as three component catalysts as exemplified by silica-alumina-magnesia and silica-alumina-zirconia.

The initial hydrosol is formed by admixing sodium silicate solution wtih an acid alum solution containing aluminum sulfate and sulfuric acid. If powder-containing beads are to be formed, the powder of suitable size and quantity may be slurried into the silicate solution employed as a sol-forming reactant. Admixing of the reactant liquids is effected by pumping streams thereof into a mixer provided with a discharge nozzle from which the reaction product formed is ejected as a hydrosol into the water immiscible liquid. Although other forms of mixing and bead-forming devices may be employed, it is preferred to utilize the type of apparatus similar to that described in Milliken U. S. Patent No. 2,588,402 of March 11, 1952.

The ejected hydrosol breaks up into small droplets in the body of oil or other water-immiscible liquid and set into firm hydrogel globules soon after their formation as these globules settle in the body of the immiscible liquid. The set globules are then passed into aqueous liquid which may be maintained as a layer below the oil. In preferred operation the aqueous liquid should be one having substantially the same composition as syneresis liquid from the hydrogel heads, which will be a solution of sodium sulfate and can be employed as sluice liquor for conveying the beads to the next processing step.

If desired the beads may be sent to a system for size classification at this point or such classification may be postponed until after final drying or calcination. If powder-containing beads are to be made, it is best to classify at this point, as described in my prior copending application, Serial No. 187,500, in order that off size beads can be utilized for grinding to powder.

The wet beads, whether or not classified as to size, are drained and may be further freed of surface moisture by blowing air thereover at about room temperature, and are then charged to the primary drying stage. In this stage the beads are reduced in moisture content to decrease their bulk and to harden them sufficiently for ready handling in subsequent wet-processing which may include purification by washing and base-exchange, and are best carried out in moving bed counter current liquid treating towers. Preferably the drying in the primary stage is carried to a point short of that at which significant breakage of beads will occur on rewetting. For most siliceous gel beads this primary drying stage may be carried out to provide beads still having a moisture content of about 300% on the washed dry (105° C.) basis, which corresponds approximately to about 200% on the unwashed dry basis.

During this preliminary drying stage evaporation takes place from the surface only and at constant rate; that is the rate of moisture removal is substantially unchanged during the entire drying stage. The beads shrink to approximately 40–50% of their original volume and are increased about 30 fold in hardness. This decrease in volume has the advantage of permitting washing of the beads with considerably smaller amounts of relatively expensive demineralized water than would otherwise be required for washing the larger volumes of freshly formed beads. Moreover, important reduction in equipment costs are realized as a result of the reduction in required volumetric capacity of the washing and base exchange equipment. Because of the large increase in hardness the beads can be handled in countercurrent washing-towers as a moving bed, thereby greatly simplifying the necessary handling equipment and obtaining improved washing efficiency.

If desired, drying during the primary stage may be carried somewhat further but short of the point at which the beads could not be rewet without excess breakage. Thus, the drying may be carried to a water content in the beads of 150–200% on a washed dry basis. However, in doing so greater care must be exercised to obtain improved drying uniformity so that few, if any, of the beads are significantly overdried to beyond the limits indicated.

The partially dried beads are now transferred to a base exchange system wherein zeolitic sodium contained therein is replaced by a non-detrimental ion or group such as aluminum or alumina. Conventional countercurrent liquid processing towers may be employed wherein the beads are fed to the top of the tower through which they flow by gravity, and the base exchange solution flows upward countercurrent to the beads. In order to provide sufficient treatment in this step without necessitating the use of towers of excessive height, a plurality of shorter towers may be employed in series communicating in such manner that counter-current flow is maintained. Batch treating may be employed without departing from the invention claimed.

After the final stage of treatment with base exchange solution, the beads are washed in demineralized water to remove soluble salts such as aluminum sulfate and sodium sulfate, that may be left in the beads.

In some instances, particularly when extremely low sodium content of the finished beads is required, it may be desirable to utilize additional chemical purification intermediate the aluminum sulfate treatment and the water washing. For instance, the intermediate purification stage may involve treatment with dilute acids or solutions of acidic salts such as ammonium sulfate.

The washed beads consisting of purified silica-alumina and containing water are then charged to the second drying stage to remove the bulk of the water. In this stage drying takes place at a "falling rate"; that is, the rate of drying decreases with decreasing water content. During this drying stage the beads are carefully brought to required moisture content and thereafter transferred to heat treatment wherein the dried beads are calcined in air or in controlled mixtures of steam and air to harden the beads, fix their structure, and stabilize or adjust catalytic activity. The heat treated beads are thereafter cooled, screened, and stored or bagged for shipment.

The foregoing description explains generally the sequence of steps employed in the continuous production of beads in practical adaptation of the invention. Various details applicable to certain of these steps will now be discussed. Although the details are given in connection with the preparation of silica-alumina beads, the same general procedure is applicable in the preparation of gel beads from reactants forming a hydrosol capable of setting to a gel and particularly to those forming an "all embracing" gel. Thus in the preparation of silica beads the reactants may be those conventionally employed for the purpose of forming silica gel; alkali metal silicate solution and acid. Other silicious plural oxide catalysts and adsorbants may be similarly prepared by coprecipitation of a soluble silicate and a soluble salt of a metal, generally an amphoteric metal, convertible to the desired oxide, including in addition to or instead of aluminum salts, for instance those of zirconium, beryllium and magnesium.

SOLUTION PREPARATION

The respective quantities of aluminum sulfate and sodium silicate admixed for hydrosol formation will, of course, depend upon the proportions of silica and alumina desired in the finished bead. To facilitate operation obtaining uniformity in composition, it is advantageous to employ equal volumetric amounts of the reactants in respective concentrations furnishing the required silica/alumina ratio. Since some alumina is also added by base-exchange, the amount so added enters into the determination of the initial concentration of aluminum sulfate used during hydrosol formation. In a typical operation, for instance, the proportions of aluminum sulfate and sodium silicate may be selected to furnish a sol containing by weight 93% silica and 7% alumina, and the hydrogel beads formed therefrom may be subsequently adjusted by base-exchange with aluminum sulfate to adjust the ratio of silica to alumina in the finished catalyst to 91:9 by weight.

In the practice of the invention it is preferred to employ such compositions and processing conditions obtaining hydrosols setting to gels in a comparatively short time. The setting time of a hydrosol is dependent upon such factors as temperature, pH and concentration of the reactants. Silica-alumina hydrosols at a pH of about 5 to 9, setting in about 0.2 to 0.5 second, are readily obtained without temperature elevation at product concentrations above about 80 grams of $SiO_2$ and $Al_2O_3$ per liter of mixed reacting solution (not considering added powder). Typical hydrosol compositions for use in preparation of clear beads may have a pH of about 8 to 9.5 and a product concentration ($SiO_2+Al_2O_3$) of about 100 to 120 grams per liter; such compositions will set to hydrogel in a second or less.

The formation of the aluminum sulfate solution by reaction of alumina trihydrate with sulfuric acid furnishes an inexpensive and convenient method for the preparation of acid alum solution of desired composition. Thus, the aluminum sulfate reaction product formed may be admixed with water to provide a 20 percent aqueous solution of $Al_2(SO_4)_3$. This solution may be conveniently employed in the base-exchange step and part of it may be adjusted by addition of water and acid to provide a solution of required concentration and pH for hydrosol formation.

Bead forming

The reactant solutions including the acid alum solution and the silicate solution are admitted to a mixing head provided with a nozzle for discharging the hydrosol thus formed (or the reaction mixture) into a tank containing the immiscible liquid. The mixing head may be of any type known to the art for this purpose, such as that described in the Milliken patent U. S. 2,588,402 of March 11, 1952. The immiscible liquid being of lower specific gravity than the hydrosol, the latter settles through the body of oil, and as a result of the interfacial tension between the oil and the hydrosol, the latter is broken up into droplets which continue to settle in the body of oil. The oil depth provided should be sufficient to permit setting of the hydrosol to firm hydrogel therein. The set hydrogel globules thus formed then continue to settle in the oil and pass through the interface into the aqueous sluice liquid in the bottom of the tank. Suitable setting liquids having a lower specific gravity than the hydrosol include petroleum naphthas, kerosene, hydrocarbon oils, halogenated hydrocarbons, or other liquids or mixtures giving desired density and viscosity.

The sluice liquid employed may be any aqueous solution compatible with the hydrogel and one preferably having about the same salt concentration as that of the liquid in the hydrogel to keep to a minimum any osmotic pressure. A 5 percent solution of sodium sulfate, for instance, could be used for this purpose.

First stage drying

The sluice liquid delivers the wet hydrogel beads to the initial drying step, or if desired, the wet hydrogel beads may be previously classified to separate out the beads of desired size range to be dried. During the drying of the beads or of the acceptable size beads conditions are controlled to obtain ultimate beads of desired hardness. Preferably the beads are drained or the surface moisture otherwise removed, before the beads enter the drier proper. During the initial drying stage the water content is reduced only in part, permitting rewetting without disruption of the beads, thereby reducing the volume of the product to be handled in such subsequent wet processing. This procedure of partially drying the beads before base-exchange and washing simplifies handling and obtains important savings in operating and investment costs. Although during such partial drying the rate and conditions encountered do not have any pronounced effect on the pore volume and strength of the beads (which becomes critical only during the later drying stage), it is nevertheless desirable even during this partial drying stage to maintain as far as possible a substantially uniform drying rate, particularly from the standpoint that any aging of the beads occurring during such partial drying will affect all of the beads substantially uniformly. The extent of aging otherwise provided and that taking place incident to initial evaporation of moisture from the wet hydrogel, fixes the final density of the heat-treated product; the more extensive that aging the lower the density. The extent of aging taking place is a function of time, temperature and pH; at higher pH and/or higher temperature aging takes place more rapidly. Accordingly, to maintain desired control of aging during initial partial drying of the wet hydrogel these factors must be regulated. For a gel of predetermined pH, aging can be controlled by suitable selection of wet bulb temperature and time, or the spread maintained between the wet and dry bulb temperatures. For gel beads of the composition under consideration, partial drying of the hydrogel to the described moisture content, is preferably carried out at a wet bulb temperature of about 120 to 160° F. and a dry bulb temperature of 130 to 260° F.; the higher the temperature the shorter will be the required drying time, over the range given the time of drying will vary from about 10 minutes to about 1.5 hours. The drying temperature is selected with reference to the aging requirements for beads of desired density and hardness; for any given density and hardness less aging is required for gels of higher pH. In general for silica-alumina beads to be used in hydrocarbon cracking a pellet density of about 1.1 to 1.2 is satisfactory. During this initial drying stage the hydrogel beads shrink to about one-half their formed volume, the water content being reduced to about 300% on a washed dried bead basis. As indicated above, the beads may be dried to a lower moisture level in this stage, as to about 150–200 volume percent, but in doing so greater care must be exercised in the selection of equipment and drying conditions to obtain increased drying uniformity.

During this preliminary partial drying stage, the wet beads may be transported on a continuous perforate belt passing through a tunnel dryer; hot gas at the required temperature and humidity being continuously blown through the belt. To obtain better uniformity of treatment it is advantageous to provide means for periodically changing the position of the beads on the belt; desirably also, the direction of gas flow through the layer of beads on the belt should be alternately reversed. A convenient method of changing the position of the beads during drying is by the provision of a plurality of short belts in series discharging the beads successively from one belt to the next, and thereby altering the respective positions occupied by the beads on the belts.

Purification

The partially dried beads are then subjected to wet processing including water washing and removal of exchangeably-held alkali metal ion. In a preferred procedure these beads are first washed in water at room temperature for one or more hours, then treated a number of times with aluminum sulfate solution to effect replacement of Na by Al, followed by further water washing. Such treatment will reduce the Na+ content of the beads to the order of about 0.3% (or somewhat below this value); if greater purity is required an intermediate treatment with ammonium sulfate solution may be used prior to the final water-washing step.

Final drying

The purified beads are drained of wash water and sent to the final drying stage. During this stage drying is at a "falling rate," and the rate of moisture removal must be particularly carefully controlled to obtain ultimate beads of desired density and hardness. It has been found that at a given drying rate the amount of strain in the bead structure is inversely proportional to the wet bulb temperature of the air, and at constant wet bulb temperature the amount of strain in the bead structure is directly proportional to the drying rate. It was found by extensive investigation that best overall results were obtained at comparatively high wet bulb temperatures. Beads of desired density and good physical strength are obtained by drying in superheated steam. In general, satisfactory drying is obtained at wet bulb temperatures of 180–212° F., higher temperatures can be employed if pressure facilities are available. The dry bulb temperature may be from about 220 to 350° F. The time and temperature are interrelated so that with increasing temperature the time is reduced. Within the temperature range above given the corresponding drying times will be from one-half hour to about 2 hours. The conditions chosen will depend in a large measure on the type and efficiency of the drying apparatus available. For instance in a drier equipped for cross circulation of drying gas and some means for agitating or turning over the layer of beads, a higher differential between wet and dry bulb should be used for optimum drying than in the case of a drier providing circulation of gas through the layer of beads.

During this drying stage the moisture content (average) of the beads is reduced to 25% (dry bead basis) or less, and may be brought to as low as 5%. Beads thus obtained, after calcination in air, have an acceptable hardness.

Calcining

The dried beads are finally subjected to heat treatment at elevated temperatures, which for catalyst preparation generally lie in the range of about 800° to about 1600° F. This heat treatment effects further hardening of the beads and stabilization of structure and activity. During such heat treatment the catalytic activity of the beads may be adjusted to the desired level by the addition or use of steam in controlled quantity as more particularly described by Bates in U. S. Patent No. 2,375,757.

Obviously many modifications and variations of the invention as hereinbefore set forth may be made without departing from the spirit and scope thereof, and therefore only such limitations should be imposed as are indicated in the appended claims.

I claim as my invention:

1. In the manufacture of inorganic clear gel bead catalyst wherein a hydrosol is set to hydrogel globules free from undissolved particles in a water-immiscible liquid, the method which comprises partially drying the globules free from undissolved particles to a moisture content within the range of 150 to 300% on washed dry basis, thereby to reduce the bulk thereof but short of that which would cause disruption on rewetting, wet-processing the partially dried globules by base exchange to remove detrimented alkali ions from the globules and to purify the same, and thereafter carefully drying the purified globules to produce dried clear gel beads.

2. In the method of preparing inorganic clear gel beads in which a hydrosol free from undissolved particles is discharged into a body of water-immiscible liquid wherein as a result of interfacial tension the hydrosol is divided into globules which set to hydrogel in said immiscible liquid, and in which the hydrogel globules free from undissolved particles are subjected to a partial drying step in a hot gas stream to prepare globules rewettable without substantial breakage, in which the partially dried globules are subjected to a step of aqueous liquid treatment and in which the treated globules are subjected to a further drying step at controlled conditions in a hot gas stream to obtain beads of good physical strength, the improvement which includes: the control of the partial drying step to prepare globules containing 150% to 300% moisture on a washed dry basis; the control of the aqueous liquid treatment step to achieve base exchange in order to remove detrimental alkali metal ions from the globules; and the control of the further drying step to maintain in the hot gas stream a wet bulb temperature of at least 180° F. and a dry bulb temperature between 220° F. and 350° F.

3. The method according to claim 2, wherein said hydrogel is formed from a hydrosol comprising silica and at least one oxide of a metal from the group consisting of aluminum, magnesium, zirconium and beryllium.

4. The method according to claim 3 wherein said metal oxide comprises alumina.

5. The method of producing silica-alumina clear gel beads having desired catalytic activity and physical strength which comprises forming in a water immiscible medium globules of a hydrogel comprising silica and alumina, said globules being free from undissolved particles aging said globules while partially drying the same by subjecting said globules to an atmosphere having a wet bulb temperature of 120 to 160° F. and a higher dry bulb temperature in the range of 130 to 260° F. for a period to cause said globules to lose moisture to a residual level in the range of 150 to 300% by weight on a washed dry gel basis, wet-processing the still wet hydrogel to purify the same, and finally drying the purified globules at a wet bulb temperature of at least 180° F.

6. The method of claim 2 in which the partial drying step is conducted for from 10 to 90 minutes, at a dry bulb temperature between 130° F. and 260° F. and at a wet bulb temperature between 120° F. and 160° F., in which the aqueous liquid treatment includes a water washing at room temperature for more than 60 minutes, a subsequent treatment with a solution of an aluminum salt to replace sodium ions with aluminum ions and a subsequent treatment with water washing, and in which the further drying is conducted for from 30 to 120 minutes to reduce the moisture content of the beads to between 5% and 25%.

References Cited in the file of this patent

UNITED STATES PATENTS

| | | |
|---|---|---|
| 2,147,985 | McKinney | Feb. 21, 1938 |
| 2,412,958 | Bates et al. | Dec. 24, 1946 |
| 2,528,767 | Marisic | Nov. 7, 1950 |
| 2,588,402 | Milliken | Mar. 11, 1952 |
| 2,665,258 | Lebeis | Jan. 5, 1954 |